3,065,189
PROCESS FOR THE PRODUCTION OF EXPANDED POLYAMIDES WHICH CONTAIN OXAMIC ACID OR OXAMIC ACID ESTERS

Friedrich Becke, Heidelberg, and Kurt Wick, Ludwigshafen (Rhine), Germany, assignors to Badische Anilin- & Soda-Fabrik Aktiengesellschaft, Ludwigshafen (Rhine), Germany
No Drawing. Filed Sept. 12, 1958, Ser. No. 760,545
Claims priority, application Germany Sept. 19, 1957
11 Claims. (Cl. 260—2.5)

This invention relates to a process for the production of expanded polyamides.

It is already known to prepare porous or cellular expanded plastic materials by heating plastics together with blowing agents. The gases set free from the blowing agents by thermal decomposition or chemical reaction expand the thermoplastically softened plastics. Most of the large number of known blowing agents decompose between 30° and 180° C. They are therefore not suitable for expanding polyamides of which the softening point lies between about 170° and 270° C.

This invention relates to the production of expanded polyamides, starting from mixtures of polyamides and blowing agents. The invention relates especially to the production of expanded polyamides starting from mixtures of monomeric polyamides-forming substances and blowing agents. A further object of the invention is the production of expandable polyamides which may be expanded at will by subsequent heating.

According to the process of the present invention, expanded polyamides can be prepared by heating a comminuted polyamide together with oxamic acid or its esters to a temperature above the softening point of the polyamide but to at least about 250° C. and below the decomposition temperature of the polyamide. The term oxamic acid and its esters means compounds of the general formula $H_2NCOCOOR$ in which R represents hydrogen or any aliphatic, cycloaliphatic or aromatic radical. R preferably represents hydrogen or an aliphatic or cycloaliphatic hydrocarbon radical with 1 to 6 carbon atoms.

The amount of the oxamic acid or its esters which is necessary for the production of the expanded article depends on the polyamide to be expanded and on the nature, especially the specific gravity, of the desired expanded article. It amounts to about 0.5 to 10%, preferably 1 to 6%.

According to this invention, the linear film-forming polyamides, for example the polycondensates of caprolactum, hexamethylene diamine adipate, hexamethylene diamine sebacate, omega-amino-oenanthic acid, caprylic lactam or also polycondensates of mixtures of such polyamide-forming substances may be expanded.

Cross-linked polyamides which are thermoplastic in a wider range of temperature than linear polyamides may be expanded with special advantage according to the present invention. Cross-linked polyamides with such a widened thermoplastic range may be obtained for example by heating the linear polyamides with small amounts, as a rule about 1 to 10%, of formaldehyde or compounds which yield formaldehyde. Cross-linked polyamides may also be prepared as it is well known by condensing linear polyamide-forming compounds together with small amounts of higher functional compounds than the starting materials for linear polyamides, such as bis-lactams, polycarboxylic acids or with diamines hydroxyalkylated on nitrogen. Of these polyfunctional compounds there are generally used 0.5 to 15%, preferably 1 to 10%, with reference to the amount of polyamide-forming substance. The cross-linked polyamides obtained with the aid of diamines hydroxyalkylated on nitrogen (hereinafter called hydroxyalkyl-diamines) may be expanded especially smoothly. Hydroxyalkyl-diamines are obtained inter alia by reaction of aldehydes, for example formaldehyde, or alkylene oxides, for example ethylene oxide, with aliphatic, cycloaliphatic or aromatic diamines, for example with ethylene diamine, hexamethylene diamine, diaminocyclohexane, diaminodicyclohexane, piperazine or phenylene diamine. The diamines may also contain hetero atoms, as for example bis-(omega-aminohexyl)-amine. The addition of the aldehydes or alkylene oxides to the diamines may take place singly or multiply with the formation of ether alcohols on one or both amino groups. The hydroxyalkyl-diamines accordingly correspond to the general formula $H(OR_1)_n—NH—X—NH—(R_2O)_mH$, in which X represents a divalent aliphatic, cycloaliphatic or aromatic radical which may contain hetero atom or atoms. $R_1$ and $R_2$ are identical or different alkylene radicals with 1 to 4 carbon atoms. $n$ and $m$ are whole numbers between 1 and 7. $n$ or $m$ may also be zero. The hydroxyalkyl diamine may bear further saturated or unsaturated aliphatic groups on nitrogen.

In many cases it is preferable for the polyamides to be expanded to contain, besides the hydroxyalkyl diamine, also a small amount of an ester of a monohydric alcohol with 1 to 6 carbon atoms and a carboxylic acid condensed in. Suitable carboxylic acid esters are for example ethyl benzoate, methyl stearate or trimethyl citrate. Especially favorable action is exerted by mono- or dimethyl or -ethyl esters of dicarboxylic acids, as for example dimethyl glutarate, monoethyl adipate, diethyl adipate or dimethyl phthalate. The amount of the mixture of carboxylic acid ester and hydroxyalkyl diamine which is to be condensed into the polyamides to be expanded preferably amounts to 0.5 to 20%, and the relative proportions of ester and amine may be varied within the limits 1:5 to 5:1. Such polyamides cross-linked with hydroxyalkyl diamines and containing carboxylic acid esters are already capable of being expanded. By heating a mixture of such polyamides with oxamic acid or oxamic acid esters to temperatures above the softening point of the polyamides, especially uniform foams are obtained.

A further possibility for obtaining cross-linked polyamides consists in the treatment of linear polyamides with energy-rich radiation. Such polyamides cross-linked by irradiation may also be expanded according to this invention.

The comminuted polyamides should be mixed as uniformly as possible with the oxamic acid or its esters. It is preferable to evaporate while stirring a suspension of a polyamide with a solution of oxamic acid or an ester of the same. It is also possible however to precipitate the oxamic acid from an aqueous solution of oxamic acid in which a polyamide powder is suspended, by the addition of methanol while stirring, and then to separate from the liquid the polyamide powder on which the oxamic acid has been precipitated in a fine form. In the case of soluble polyamides it is advantageous to evaporate a solution containing the polyamide and the blowing agent. The evaporation may take place for example in spray driers.

The production of expanded polyamides from polyamides and oxamic acid or oxamic acid esters is effected by heating the mixtures in a mold in an atmosphere free from oxygen to a temperature above the softening point of the polyamide, but to at least 250° C. It is preferable to heat the expandable mixtures to temperatures between 270° and 280° C. The duration of the heating is in general about 30 to 180 minutes. A further method of obtaining intimate expandable mixtures of polyamides and oxamic acid or oxamic acid esters is the condensation of polyamide-forming substances in the presence of the blowing agent. By polyamide-forming substances we understand compounds or mixtures which form linear polyamides, such as dicarboxylic acid salts of diamines, for example hexamethylene diamine adipate, hexamethylene diamine sebacate or octamethylene diamine suberate, or also omega-amino-carboxylic acids, for example omega-aminocaproic acid.

Polyamide-forming derivatives of these compounds are also suitable, such as lactams, for example caprolactam, oenanthic lactam or caprylic lactam, or mixtures of different polyamide-forming substances. For the production of expanded articles in this way, about the same amount of blowing agent is required as when starting from ready-made polyamides. In order to obtain industrially exploitable expanded articles, it is necessary to add to the mixtures to be polymerized, besides the blowing agents, also cross-linking agents in amounts of 0.5 to 15% with reference to the amount of polyamide-forming substance. It is preferable to add 1 to 10% of the cross-linking agents. As cross-linking agents there are suitable the above-mentioned polyfunctional compounds, namely bislactams, polycarboxylic acids or especially hydroxyalkyl diamines. The hydroxyalkyl diamines are preferably used in the form of their dicarboxylic acid salts.

When the condensation is at temperatures above about 250° C. or when the reaction mixture is heated to temperatures above about 250° C. towards the close of the condensation, expanded polyamides are obtained in one operation from the polyamide-forming substances. If the condensation is carried out, however, at temperatures between 150° and about 240° C. until the condensate formed is still at least partly soluble in concentrated sulfuric acid, there is no appreciable foam formation because the oxamic acid or its ester dispersed in the polyamide only decomposes to a trivial extent in this temperature range. These condensates are however still expandable and may be expanded at will by later heating to temperatures above about 250° C., preferably by heating to 270° to 280° C. For this purpose the expandable condensate is preferably pulverized and the powder heated in an atmosphere free from oxygen.

By the condensation there are first formed viscous masses which must be mixed well at least periodically for the removal of the water of reaction. The condensation may therefore be carried out with special advantage in heated kneaders. If the viscous plastic mass is further kneaded for sime time at the same temperature beyond the normal reaction period, it finally disintegrates into a fine expandable powder. In other cases, the condensate may be ground to powder after cooling. The expanded articles prepared according to the present invention are very tough and stable in shape. The bulk density may be varied within wide limits by altering the amount of blowing agent added and by varying the nature of the heating during the expansion. As a rule the bulk density amounts to 0.1 to 0.3 gram per cubic centimetre.

The expanded articles, which may be prepared in any desired shape, for example as plates, rods, solid and hollow articles, may be cut, sawn, bored, nailed, or screwed or welded by the technique usual in working up plastics.

The following examples will further illustrate this invention but the invention is not restricted to these examples. The parts specified in the examples are parts by weight.

Example 1

100 parts of a polyamide in powder form derived from caprolactam and 1 part of oxamic acid are mixed and heated at 250° C. in an atmosphere free from oxygen for an hour. The expanded article obtained has a bulk density of 0.25.

Example 2

100 parts of a pulverulent polyamide derived from 60% of hexamethylene diamine adipate and 40% of caprolactam and 2 parts of oxalic acid ethyl ester amide are dissolved in 80% of aqueous ethyl alcohol and freed from solvent in a spray drier. The powder formed is heated for half an hour at 280° C. in a flat rectangular mold. The expanded plate formed has a bulk density of 0.18.

Example 3

100 parts of a powdered polyamide which has been formed by condensation of caprolactam with the addition of 3% of N-(hydroxy-ethyl)-hexamethylene diamine, are well mixed with 0.8 part of oxamic acid and heated for 3 hours at 275° C. The expanded article obtained has a bulk density of 0.29.

Under the same conditions, an expanded article of the bulk density 0.3 is obtained from a powder consisting of a polycondensate of hexamethylene diamine adipate cross-linked with 3% of methylene-bis-caprolactam.

Example 4

100 parts of a powdered polyamide which has been prepared from hexamethylene diamine adipate with the addition of 1.5% of N-(hydroxyethyl)-hexamethylene diamine and 1.5% of dimethyl terephthalate by heating for four hours at 220° C., and 1.1 part of oxalic acid ethyl ester amide are heated in a cylindrical mould for 2 hours at 280° C. The expanded polyamide rod obtained has a bulk density of 0.21.

Example 5

100 parts hexamethylene diamine adipate, 5 parts of methyl oxamate and 6 parts of N-(hydroxyethyl)-hexamethylene diamine adipate are heated in a glass vessel in a nitrogen atmosphere for 2 hours at 200° C. The viscous plastic mass thus formed is hard and brittle after cooling and has the K-value 35 (measured in sulfuric acid).

The reaction mass is pulverized and heated in a mould at 270° to 280° C. An expanded article having the bulk density of 0.2 is obtained.

Example 6

100 parts of hexamethylene diamine adipate, 10 parts of caprolactam, 2.5 parts of oxamic acid, 2.5 parts of N,N'-dis-(hydroxyethyl)-hexamethylene diamine adipate are heated as described in Example 5. From the resultant expandable composition there is formed by heating to 275° C. an expanded article having the bulk density 0.23.

Example 7

100 parts of hexamethylene diamine adipate, 2.5 parts of oxamic acid ethyl ester and 4 parts of N-(hydroxyethyl)-hexamethylene diamine adipate are heated under nitrogen in a refined steel kneader capable of being heated by oil circulation. The oil supply is kept at 210° C. so that the oil return is then at about 200° C. After the water set free by the polycondensation has escaped, there is formed from the previously viscous plastic mass in the course of about 2 hours with further kneading at the same temperature, a fine loose powder. It is further kneaded at the same temperature for another 3 hours and then cooled. The pure white powder has the K-value 36.

By heating for 2 hours in a rectangular mold under nitrogen at 275° C., there is formed from the powder an expanded plate of the bulk density 0.18.

We claim:
1. A process for the production of expanded polyamides which comprises: mixing a comminuted polyamide selected from the group consisting of polycondensates of caprolactam, hexamethylene diamine adipate, hexamethylene diamine sebacate, omega-amino-oenanthic acid, octamethylene diamine suberate, omega-aminocaproic acid, caprylic lactam and mixtures thereof with 0.5 to 10% per weight with reference to the weight of the polyamide of a compound of the formula

$H_2NCOCOOR$ in which R represents a member selected from the group consisting of hydrogen methyl and ethyl, and heating the mixture to a temperature of between about 250° and 280° C.

2. A process as claimed in claim 1 in which the polyamide is cross-linked.

3. A process for the production of expanded polyamides which comprises: mixing a polyamide-forming compound selected from the group consisting of caprolactam, hexamethylene diamine adipate, hexamethylene diamine sebacate, omega-aminooenanthic acid, octamethylene diamine suberate, omega-aminocaproic acid, caprylic lactam and mixtures thereof with 0.5 to 10% of a compound of the formula $H_2NCOCOOR$ in which R represents a member selected from the group consisting of hydrogen methyl and ethyl, and heating said polyamide-forming compounds to a temperature between about 150° and 240° C. and then heating the resulting polycondensate to a temperature between about 250° and 280° C.

4. A process as claimed in claim 3 in which said polyamide-forming compound is cross-linked while heating at a temperature between 150° and 240° C.

5. A process as claimed in claim 3 in which oxamic acid methyl ester is used as the compound of the formula $H_2NCOCOOR$ 6. A process as claimed in claim 3 in which oxamic acid ethyl ester is used as the compound of the formula $H_2NCOCOOR$ 7. A process for the production of expanded polyamides which comprises: mixing a polyamide-forming compound selected from the group consisting of caprolactam, hexamethylene diamine adipate, hexamethylene diamine sebacate, omega-aminooenanthic acid, octamethylene diamine suberate, omega-aminocaproic acid, caprylic lactam and mixtures thereof with 0.5 to 10% of a compound of the formula $H_2NCOCOOR$ in which R represents a member selected from the group consisting of hydrogen methyl and ethyl, and heating said mixture at a temperature between about 250° and 280° C. and thereby condensing and expanding said polyamide-forming compounds.

8. A process as claimed in claim 7 in which the polyamide-forming compounds are cross-linked during said heating.

9. A process for the production of expandable polyamides which comprises: mixing a polyamide-forming compound selected from the group consisting of caprolactam, hexamethylene diamine adipate, hexamethylene diamine sebacate, omega-amino-oenanthic acid, octamethylene diamine suberate, omega-aminocaproic acid, caprylic lactam and mixtures thereof with 0.5 to 10% of a compound of the formula $H_2NCOCOOR$ in which R represents a member selected from the group consisting of hydrogen methyl and ethyl, and heating the mixture to a temperature between about 150° and 240° C. thereby condensing said polyamide-forming compounds to polyamides.

10. A process for the production of expanded polycaprolactam which comprises: mixing polycaprolactam with 0.5 to 10% by weight with reference to the polycaprolactam of oxamic acid, and heating said mixture at a temperature between 250° and 280° C.

11. A process for the production of expanded polyamides which comprises: heating a mixture of (A) a polyamide selected from the group consisting of polycondensates of caprolactam, hexamethylene diamine adipate, hexamethylene diamine sebacate, omega-amino-oenanthic acid, octamethylene diamine suberate, omega-aminocaproic acid, caprylic lactam and mixtures thereof and (B) 0.5 to 10% by weight with reference to the weight of the polyamide of a compound of the formula $H_2NCOCOOR$ in which R represents a member selected from the group consisting of hydrogen methyl and ethyl to a temperature between about 250° and 280° C.

References Cited in the file of this patent

UNITED STATES PATENTS

| | | |
|---|---|---|
| 2,268,160 | Miles | Dec. 30, 1941 |
| 2,628,945 | Wayne | Feb. 17, 1953 |
| 2,634,243 | Glenn | Apr. 7, 1953 |

OTHER REFERENCES

Sidgwick: "Organic Chemistry of Nitrogen," published 1937 by Oxford Univ. Press, page 148.